United States Patent
Boys et al.

(10) Patent No.: US 9,767,955 B2
(45) Date of Patent: Sep. 19, 2017

(54) MULTI POWER SOURCED ELECTRIC VEHICLE

(71) Applicants: John Talbot Boys, Auckland (NZ); Grant Anthony Covic, Auckland (NZ)

(72) Inventors: John Talbot Boys, Auckland (NZ); Grant Anthony Covic, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 493 days.

(21) Appl. No.: 14/120,197

(22) Filed: May 5, 2014

(65) Prior Publication Data

US 2015/0008752 A1 Jan. 8, 2015

Related U.S. Application Data

(62) Division of application No. 12/451,436, filed as application No. PCT/NZ2008/000103 on May 9, 2008, now Pat. No. 8,749,334.

(51) Int. Cl.
*H01F 5/00* (2006.01)
*H01F 38/14* (2006.01)
(Continued)

(52) U.S. Cl.
CPC ............ *H01F 38/14* (2013.01); *B60L 11/182* (2013.01); *B60L 11/1816* (2013.01); *B60L 11/1829* (2013.01); *B60L 11/1842* (2013.01); *B60L 11/1844* (2013.01); *H01F 5/00* (2013.01); *H02J 5/005* (2013.01); *H02J 7/0042* (2013.01); *H02J 7/025* (2013.01); *B60L 2230/16* (2013.01); *B60L 2250/16* (2013.01); *Y02E 60/721* (2013.01); *Y02T 10/7005* (2013.01); *Y02T 10/7088* (2013.01); *Y02T 90/121* (2013.01); *Y02T 90/122* (2013.01); *Y02T 90/125* (2013.01);
(Continued)

(58) Field of Classification Search
CPC .................. H01F 5/00; H01F 27/00–27/30
USPC ............................ 336/84 R, 84 M, 200, 232
See application file for complete search history.

(56) References Cited

U.S. PATENT DOCUMENTS

| 4,800,328 A | 1/1989 | Bolger et al. |
| 4,873,677 A | 10/1989 | Sakamoto et al. |

(Continued)

FOREIGN PATENT DOCUMENTS

| EP | 1205340 | 5/2002 |
| JP | 03-239136 | 10/1991 |

(Continued)

OTHER PUBLICATIONS

Notice of Reasons for Rejection in corresponding Japanese application p2010-507347 (Original and English Translation).

*Primary Examiner* — Tuyen Nguyen
(74) *Attorney, Agent, or Firm* — Law Office of Richard F. Jaworski, PC

(57) ABSTRACT

An inductive power transfer pad for transmitting wireless power to a wireless power receiver separable from the inductive power transfer pad. The inductive power transfer pad includes a coil having at least one turn of a conductor in a first layer and a plurality of ferromagnetic slabs arranged in a second layer substantially parallel to that of the coil, the ferromagnetic slabs being arranged so as to be spaced apart from one another about the coil with their lengths extending across a longitudinal length of the coil.

13 Claims, 5 Drawing Sheets

(51) Int. Cl.
*B60L 11/18* (2006.01)
*H02J 5/00* (2016.01)
*H02J 7/00* (2006.01)
*H02J 7/02* (2016.01)

(52) U.S. Cl.
CPC .............. *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | |
|---|---|---|
| 5,202,617 A | 4/1993 | Nor |
| 5,469,036 A | 11/1995 | Eto |
| 5,528,113 A | 6/1996 | Boys et al. |
| 5,594,318 A | 1/1997 | Nor et al. |
| 5,710,502 A | 1/1998 | Poumey |
| 5,821,638 A | 10/1998 | Boys et al. |
| 5,821,731 A | 10/1998 | Kuki et al. |
| 6,389,318 B1 | 5/2002 | Zarinetchi et al. |
| 6,429,651 B1 * | 8/2002 | Choi ............... G01R 33/04 324/225 |
| 6,501,364 B1 | 12/2002 | Hui et al. |
| 6,906,495 B2 | 6/2005 | Cheng et al. |
| 6,934,167 B2 | 8/2005 | Jang et al. |
| 7,164,255 B2 | 1/2007 | Hui |
| 7,463,131 B1 * | 12/2008 | Hwang ............ H01F 17/0006 336/200 |
| 7,875,955 B1 * | 1/2011 | Hopper ............ H01F 17/0006 257/516 |
| 8,030,888 B2 | 10/2011 | Pandya et al. |
| 8,102,236 B1 * | 1/2012 | Fontana, Jr. ............ H01F 3/14 336/200 |
| 2003/0052647 A1 | 3/2003 | Yoshida et al. |
| 2006/0219448 A1 | 10/2006 | Grieve et al. |
| 2008/0238601 A1 * | 10/2008 | Das .................... H01F 1/24 336/200 |
| 2009/0278492 A1 | 11/2009 | Shimizu et al. |

FOREIGN PATENT DOCUMENTS

| | | |
|---|---|---|
| JP | 06-64393 | 9/1994 |
| JP | 6-66206 | 9/1994 |
| JP | 06-277358 | 10/1994 |
| JP | 6-86321 | 12/1994 |
| JP | 8-238326 | 9/1996 |
| JP | 9-213378 | 8/1997 |
| JP | 10189369 | 7/1998 |
| JP | 11503599 | 3/1999 |
| JP | 11-097263 | 4/1999 |
| JP | 11252810 | 9/1999 |
| JP | 2000-200725 | 7/2000 |
| JP | 200255176 | 2/2002 |
| JP | 2002137659 | 5/2002 |
| JP | 2002-231545 | 8/2002 |
| JP | 2002-343655 | 11/2002 |
| JP | 2004-47701 | 2/2004 |
| JP | 2005101392 | 4/2005 |
| JP | 200642519 | 2/2006 |
| JP | 2006203959 | 8/2006 |
| JP | T2007-505480 | 3/2007 |
| JP | 08505279 | 2/2008 |
| JP | 200887733 | 4/2008 |
| KR | 1020040028312 | 4/2004 |
| WO | WO 03105308 | 12/2003 |
| WO | WO 2005024865 | 3/2005 |
| WO | WO 2006101285 | 9/2006 |
| WO | 2007008646 | 1/2007 |
| WO | WO 2008051611 | 5/2008 |

* cited by examiner

MULTI POWER SOURCED ELECTRIC VEHICLE

REFERENCE TO RELATED APPLICATIONS

The present disclosure is a Divisional Application of co-pending U.S. patent application Ser. No. 12/451,436 filed Jan. 13, 2010 which is based on and claims benefit from International Application Number PCT/NZ2008/000103 filed on May 9, 2008 which claims benefit from New Zealand applications 555128 filed May 10, 2007 and 556646 filed Jul. 20, 2007, the entire contents of each of which are herein incorporated by reference.

FIELD OF THE INVENTION

The present invention relates to an Inductive Power Transfer (IPT) pad, a system, method and means for charging a battery of an electric vehicle using multiple power sources and an electric vehicle powered by said battery. More particularly, the invention relates to charging the battery for an electric vehicle selectively using a high power source for charging at a high rate or a lower power source for charging at a lower rate.

BACKGROUND

In the development of pure electric vehicles (i.e., those powered solely by electricity as opposed to hybrid vehicles), there are a number of problems to be solved before these vehicles can gain widespread acceptance. These include the limited range compared with more conventionally fuelled vehicles, the inconvenience of having to remember to recharge a vehicle (even if it is possible to do so at the user's premises or home) and the severe restrictions that occur should the vehicle not be charged. These problems have been subjected to greater consideration in recent times due to heightened concerns about global warming. Pure electric vehicles may have a role to play in reducing the effects of global warming as they are clearly the lowest polluters of all vehicle types and are capable of operating with a lower carbon 'footprint' than vehicles powered by more widespread and conventional means.

Many problems with electric vehicles stem directly from the battery used to store energy to power the vehicle. Virtually all battery types must be charged at a rate that is less than the allowable discharge rate, they have a limited capacity, and their cycle life is not great. Thus, it takes quite a long time to charge a vehicle, the time between charges is shorter than ideal, and the functionality of the battery declines rapidly with age.

In use, electric vehicles are however very convenient and make ideal shopping baskets and short trip commuter vehicles. Other tasks such as dropping off children at schools and running errands are also well suited. If the accumulated distance travelled in a day is within the range of the vehicle, then the battery may be recharged over-night, with service capable of being resumed the next day. This is an ideal scenario. However, if the available range is exceeded or the battery has not been sufficiently charged, the driver and passengers may be left stranded, there will likely be a recovery fee, the battery will need to be fully charged over a longer period of time than a conventional charge cycle and, when using conventional batteries, these will almost certainly be degraded such that their available capacity is permanently reduced from what it was previously. Opportunity charging can help to eliminate this problem and involves partially charging the vehicle whenever an opportunity presents itself.

In perhaps a more serious situation where circumstances call for the vehicle to be taken on a long trip, there is little that can be done. Here hybrid vehicles may be a good solution as they can travel great distances on fossil fuels and refuel at conventional petrol stations.

For these reasons conventional pure electric vehicles have not met all of the modern requirements for a passenger transport vehicle.

Inductive Power Transfer (IPT) provides a useful alternative to more conventional charging. A charger using IPT is described in New Zealand Patent Application No. 545664, entitled "Single Phase Power Supply for Inductively Coupled Power Transfer Systems" and is incorporated herein by reference. This charger provides many advantages in that it will operate from a standard single phase supply typically available in the home, has an excellent power factor and very low harmonics. As a result of this, it would be possible to operate with several thousand of these connected to a utility network without the quality of supply being degraded. Moreover, the use of IPT obviates the need for a user to manually connect a cable to the battery.

SUMMARY OF THE INVENTION

It is an object of the invention to provide an improved Inductive Power Transfer (IPT) pad.

It is an object of the invention to provide means for charging a vehicle which mitigates the aforementioned problems associated with conventional electric vehicles.

An alternative object of the invention is to provide a system for charging an electric vehicle.

An alternative object of the invention is to provide a method of charging an electric vehicle.

Alternatively, it is an object of the invention to at least provide a useful choice.

According to a first aspect of the invention, there is provided an inductive power transfer (IPT) pad comprising a coil having at least one turn of a conductor; one or more ferromagnetic slabs; and a shield member arranged around both said coil and said ferromagnetic slabs for channelling electromagnetic flux when in use.

Preferably, the conductor is litz wire.

Preferably, the coil comprises a plurality of turns of wire.

Preferably, the ferromagnetic slabs are monolithic slabs.

Preferably, the ferromagnetic slabs are ferrite slabs.

Preferably, each ferromagnetic slab is arranged in substantially the same plane.

Preferably, each ferromagnetic slab is arranged such that its length extends radially from a common point but spaced apart therefrom.

Preferably, each ferromagnetic slab is spaced apart from adjacent slabs by substantially the same angle.

According to a preferred embodiment, the IPT pad comprises eight ferromagnetic slabs each spaced apart from adjacent slabs by approximately 45°. Other configurations may be selected depending on system requirements.

Alternatively, in another embodiment, the IPT pad comprises a plurality of ferromagnetic slabs whereby a subset of the ferromagnetic slabs extend radially from a common point but are spaced apart therefrom, a further subset of the ferromagnetic slabs extend radially from a different common point but are spaced apart therefrom, and a still further subset of the ferromagnetic slabs are aligned perpendicularly to the direction of an imaginary straight line connecting the said common points, whereby the still further subset of ferromagnetic slabs are positioned equidistantly from the imaginary line but spaced equally along its length and equally on each side of the imaginary line.

Preferably, the coil is arranged in a plane substantially parallel to that of the ferromagnetic slabs.

Preferably, the coil is positioned to wind around the common point such that it passes each slab at approximately the centre of the length of each slab.

Preferably, the IPT pad comprises a substantially rigid backplate.

Preferably, the backplate is substantially planar.

Preferably, the plane of the backplate is substantially parallel to the planes of the ferromagnetic slabs and the coil, with the plane of the slabs located between the planes of the backplate and the coil.

Preferably, each ferromagnetic slab is spaced apart from the backplate by a thermally conductive and mechanically insulating material so as to allow the transfer of heat there between and protect the slab from mechanical shock. According to one embodiment, each slab may be spaced apart from the backplate using foam or rubber pads. The material making up the slabs is brittle and such steps serve to prevent cracking in the slabs caused by rapid temperature changes and also due to mechanical stresses exerted on the IPT pad.

According to preferred embodiments, the backplane is formed from a material which substantially inhibits the passage of magnetic flux therethrough. In one embodiment, this material is aluminium.

Preferably, the shield member is formed from a strip of material with the ends thereof joined to form a ring.

Preferably, the shield member is formed from aluminium.

Preferably, the shield member is coupled to the backplane.

Preferably, the IPT pad comprises a member having spaces formed therein for holding the ferromagnetic slabs in position and having a channel for accommodating the coil.

Preferably, the member is formed from a material which does not significantly affect magnetic flux. In one embodiment, foam or rubber is used.

Preferably, the member is formed by a moulding process.

Preferably, the IPT pad comprises a cover plate formed from a material that is substantially transparent to magnetic flux. In one embodiment this material is a non-toxic plastic.

According to preferred embodiments, the cover plate and the backplate provide front and rear walls of a housing for the IPT pad, with side walls provided by the shield member, the shield member preferably being configured to extend from the backplate to the cover plate.

The IPT pad according to the first aspect provides for improved performance in use by channelling the flow of flux from the charging pad. More particularly, the backplate and the shield member serve to direct flux upwards from the plane of the backplate with less splay of flux in and parallel to the plane of the backplate. This not only improves the inductive coupling but also reduces the chance that any undesired objects will be subjected to the induced fields during use. It is important to note that if this leakage is not controlled, it can lead to damage of such objects. For example, in the case of an electric vehicle, such leakage may result in the wheel bearings eroding.

The IPT pad of the present invention is also beneficial in that it is relatively slimline compared to more conventional IPT pickups. This is particularly important where pickup pads are coupled to the underside of an electric vehicle since it is important that ground clearance is maintained.

According to a second aspect, there is provided an inductive power transfer system comprising two inductive power transfer pads, wherein the two inductive power transfer pads are used in combination, one of the pads being used as a pickup pad and the other pad as a charging pad.

Preferably, the charging pad is coupleable to a power supply and inductively transfers power to the pickup pad, which is coupleable to a load, such as a battery.

According to a third aspect, there is provided an apparatus for charging a battery of an electric or a hybrid electric vehicle, the apparatus comprising first means for selectively coupling the battery to a high power electrical supply; and second means for selectively coupling the battery to a lower power electrical supply wherein the second means for coupling comprises a pickup pad electrically coupled to the battery, wherein power is transferred to the pickup pad from a charging pad by inductive power transfer.

Preferably, the first means for coupling comprises a socket electrically coupled to the battery, wherein power is transferred by plugging a cable connected to the high power electrical supply into the socket. Thus, electrical energy may be rapidly transferred to the battery using the first means for coupling, resulting in rapid charging.

As would be apparent to one of skill in the art, alternatively, the first means for coupling comprises a plug electrically coupled to the battery, wherein power is transferred by plugging the plug into a socket connected to the cable connected to the high power electrical supply.

Preferably, the second means for coupling comprises a pickup pad according to the first aspect of the invention.

The use of IPT avoids the need for a user to plug in a cable for opportunity charging, including when a vehicle is parked overnight. Additionally or alternatively, a second socket may be provided or the first socket adapted, if required, so that the battery may be connected to a lower power supply using a cable. Again, in the alternative, the second socket may be substituted by a plug configured to mate with a socket connected to the lower power supply. Such embodiments provide for improved flexibility in that, where provided and where time permits, the battery may be charged using IPT. If rapid charging is required and a high power supply is available, the battery may be connected thereto. However, there remains the possibility that a battery will require charging where neither an IPT charging pad or a high power supply is available. A user could, perhaps, put the charging pad inside the vehicle when in transit so that, as required, it could be removed from the vehicle, appropriately positioned and used for charging. This is possible because embodiments of the invention involving IPT preferably work to widely available household voltages but this is inconvenient. Thus, the second socket may be provided, preferably on an outer surface of the vehicle, to enable the battery to be connected, via a cable, to a lower power supply, such as via a conventional household socket. According to preferred embodiments, the socket used for coupling to the high power supply may also be used to couple to a lower power supply. It is therefore possible to charge a battery via most household circuits, with only a cable needing to be carried in the vehicle.

Thus, depending on requirements and which types of power supply and forms of transfer are available, a user may selectively couple the battery to a high power supply or a lower power electrical supply, preferably using IPT for transferring power from the lower power supply.

Preferably, the high power supply has a transfer rating between 10 kW and 500 kW.

Preferably, the lower power supply has a transfer rating between 0.5 kW and 2.5 kW so that it may be provided by conventional household wiring. More preferably, the lower power supply is between 1.0 kW and 2.2 kW.

Use of the word "battery" throughout the specification is not used in a limiting way and may include one or any number of cells or batteries, or super capacitors.

Preferably, the apparatus comprises an indication means for indicating alignment between the charging pad and the pickup pad.

Preferably, the apparatus comprises an indication means for indicating when the battery is being charged.

According to a fourth aspect of the invention, there is provided an electric vehicle comprising a rechargeable battery and the apparatus of the third aspect for charging said battery.

The electric vehicle may be a "pure electric vehicle" in that it may be powered only by electrical energy. However, the invention is not limited thereto and may be applied to hybrid vehicles which may be powered by electrical energy and at least one other energy source, such as a combustible fuel. Thus, references to "electric vehicles" herein include both pure electric vehicles and hybrid vehicles having electrical energy as one source of power.

According to a fifth aspect of the invention, there is provided a method of charging a battery of an electric or a hybrid electric vehicle, the method comprising selectively coupling the battery to a high power supply or a lower power supply, wherein said coupling the battery to a lower power supply comprises positioning an inductive power transfer pickup pad electrically coupled to the battery in close proximity to an inductive power transfer charging pad.

Preferably, the step of connecting the battery to the high power supply comprises mating a plug with a socket, wherein the plug is associated with one of the battery and the high power supply, and the socket is associated with the other one of the battery and the high power supply.

More preferably, the pickup pad is coupled to the underside of the vehicle and the charging pad is provided on the ground, wherein said selectively coupling the battery to the lower power supply comprises driving the vehicle into a position such that the pickup pad is positioned above, or operably adjacent to, the charging pad.

Preferably, the charging and pickup pads can be variably distanced from each other. The charging pad may be raised and lowered from the ground by a raising and lowering means. Alternatively, the pickup pad may be raised and lowered from the underside of the vehicle by a raising and lowering means.

Preferably, the method comprises indicating alignment between the charging pad and the pickup pad.

Preferably, the method comprises indicating when the battery is being charged.

Placement of an IPT pickup pad on the underside of a vehicle is preferred for aesthetic reasons, because this arrangement provides no physical obstacle to those moving around the vehicle while it is being charged, and because it is improbable that people or other foreign objects will be subjected to the induced fields during charging. However, the invention is not limited to such placement. A pickup pad may be located essentially anywhere on the vehicle with the charging pad being mounted so that IPT transfer is enabled when the vehicle is parked in position. For example, a pickup pad may be provided on the front or rear surface of the vehicle with the charging pad being mounted on a wall in a garage so that they inductively couple when the vehicle is parked. While not preferred due to the requirement for user intervention, the invention does not preclude the mounting of the pickup pad and/or the charging pad on a moveable mounting or armature, whereby, following parking of a vehicle, a user may move one or both of the pads so that IPT transfer is enabled. While having the drawback of requiring greater user intervention, such embodiments do allow for greater tolerances in the parking position of the vehicle.

According to a sixth aspect, there is provided a system for charging a battery of an electric or a hybrid electric vehicle, the system comprising an electricity network or subnetwork having at least one generator; cabling for transferring energy generated by the at least one generator around the network; IPT coupling means for coupling the network to the battery; and control means for controlling the power transfer from the at least one generator to the battery.

Preferably, the network is coupled to a plurality of batteries of a corresponding plurality of electric or hybrid electric vehicles.

Any energy source may be used by the generator(s) to generate electrical energy. However, according to preferred embodiments, a renewable energy source is used. Through use of the control means, it is possible to overcome problems associated with the fluctuable nature of power generated from renewable sources and enhance the stability of the network by varying the power supplied to the battery so that the power demand on the network better matches the available power. These benefits are more marked according to embodiments of the system in which the network is coupled to a plurality of batteries of a corresponding plurality of electric or hybrid electric vehicles.

Preferably, the control means is configured to vary the power transfer so as to optimise the load factor. Thus, a network controller (e.g. a utility company) may vary the power transfer to batteries connected to their network to better match supply and demand.

According to one embodiment, the batteries in the vehicles are owned by a network controller which operates the network and are leased to the owners of the vehicles.

The system of the sixth aspect preferably comprises at least one IPT pad according to the first aspect and/or at least one apparatus for charging according to the third aspect and/or at least one electric vehicle according to the fourth aspect.

Preferably, the control means is controlled by way of a communications channel.

According to a seventh aspect of the invention, there is provided a method of charging a battery of an electric or a hybrid electric vehicle, the method comprising the steps of coupling the battery to an electricity network or subnetwork using inductive power transfer; transferring electrical energy to the battery via the network; and varying the power transfer according to at least one predetermined criteria.

Preferably, the at least one predetermined criteria may comprise one or more of: a time of day; the level of demand on the network; the level of available supply in the network, which is particularly relevant where the energy source for the network is fluctuable.

Preferably, the method further comprises the steps of coupling batteries of a plurality of electric vehicles to the network and selectively transferring power to all or a subset thereof.

Preferably, the method further comprises the steps of: coupling batteries of a plurality of electric vehicles to the network; and selectively transferring power to all batteries or a subset thereof.

Preferably, the method comprises the step of varying the electricity mains frequency to determine the battery load on the network.

According to an eighth aspect of the invention there is provided a system for supplying power to an electricity network, the system comprising: an electricity network or subnetwork having at least one generator; a plurality of batteries of a plurality of electric or electric hybrid vehicles; cabling for transferring energy stored in the plurality of batteries; IPT coupling means for coupling the batteries to the network; and control means for controlling the power transfer from the plurality of batteries to the network.

According to a ninth aspect of the invention there is provided a method of supplying power to an electricity network, the method comprising the steps of: coupling a plurality of batteries of a plurality of electric or hybrid electric vehicles to the network using inductive power transfer; transferring electrical energy to the network from the battery; and varying the power transfer according to at least one predetermined criteria.

According to a tenth aspect of the invention there is provided a system for controlling load demand in an electricity network, the system comprising: an electricity network having at least one generator, the frequency of power supplied by the network being allowed to vary; at least one load connected to the network; and control means to monitor the frequency of power supplied by the network, the control means increasing or reducing power consumed by the load dependent on the frequency.

According to an eleventh aspect of the invention there is provided a method of controlling load demand on an electricity network, the method comprising: allowing the frequency of power supplied by the network to vary; monitoring the frequency of power supplied by the network; and increasing or reducing the power consumed by the load dependent on the frequency.

Further aspects of the invention, which should be considered in all its novel aspects, will become apparent to those skilled in the art upon reading the following description which provides at least one example of a practical application of the invention.

BRIEF DESCRIPTION OF THE DRAWINGS

One or more embodiments of the invention will be described below by way of example only and without intending to be limiting with reference to the following drawings, in which.

DETAILED DESCRIPTION OF PREFERRED EMBODIMENTS

Embodiments of the invention provide for a multi-source electric vehicle that is able to operate in most situations that may occur in terms of types, length and frequency of trips. References to "multi-source electric vehicles" are used to refer to electric vehicles embodying or capable of operating with embodiments of the present invention where the batteries and/or cells used to power the vehicle may be charged using various electrical power sources. Embodiments of the invention provide all of the advantages of a plug-in electric vehicle in that it can be recharged 'at home' overnight but, according to preferred embodiments, it does so without the disadvantage of requiring a cable to be plugged in. More particularly, according to preferred embodiments, a charging pad is preferably provided on the floor where the vehicle is usually parked, such as in the floor of a user's garage. While the vehicle is parked, the charging pad transfers energy to the vehicle's battery by Inductive Power Transfer (IPT) via a pickup provided on the underside of the vehicle. With nothing to plug in there is nothing to remember and the battery will be fully charged dependent only on the time available.

The charging pad provided on the floor is energised by a power supply and the magnetic field produced thereby couples power into the pickup attached to the vehicle and charges the on-board battery. Power transfer rates of up to around 2.2 kW are compatible with household outputs on most utility networks. The control of this power flow may be achieved using the technique described in U.S. Pat. No. 5,293,308, which is incorporated herein by reference. Other methods are also within the scope of the invention.

Figure 1:
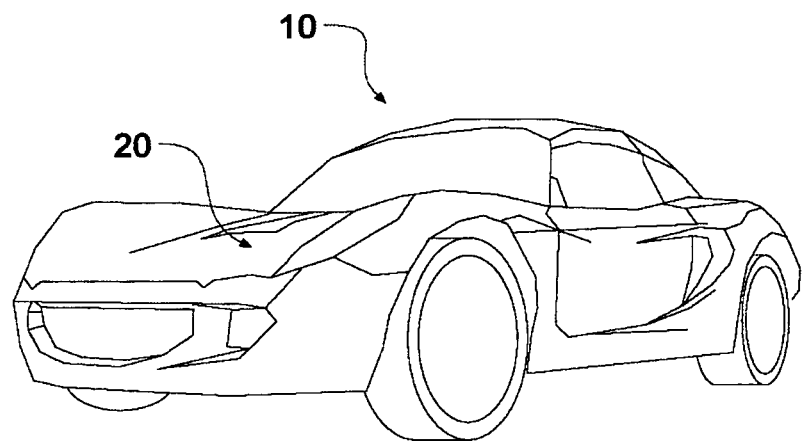
FIG. 1 is a perspective view showing a preferred relative positioning of an IPT charging pad and an electric vehicle during charging.

FIG. 1 shows a preferred relative positioning of charging pad 20 and vehicle 10 during charging. The pickup pad (not shown) is preferably of the same shape and configuration of charging pad 20 and is positioned on the underside of vehicle 10 so that it is substantially directly above charging pad 20 when vehicle 10 is parked. The magnetic flux produced by charging pad 20 links the two pads. There is no functional requirement for the pickup pad to be positioned underneath the vehicle but this is preferred for aesthetic reasons and relative ease of installation for retrofitted vehicles.

Figure 2:
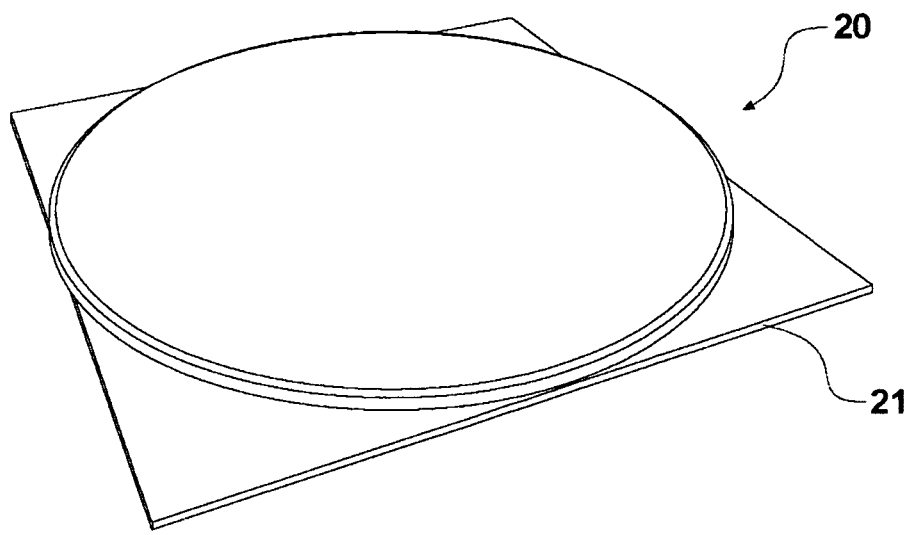
FIG. 2 is a perspective view of a preferred embodiment of an IPT pad.
Figure 3:
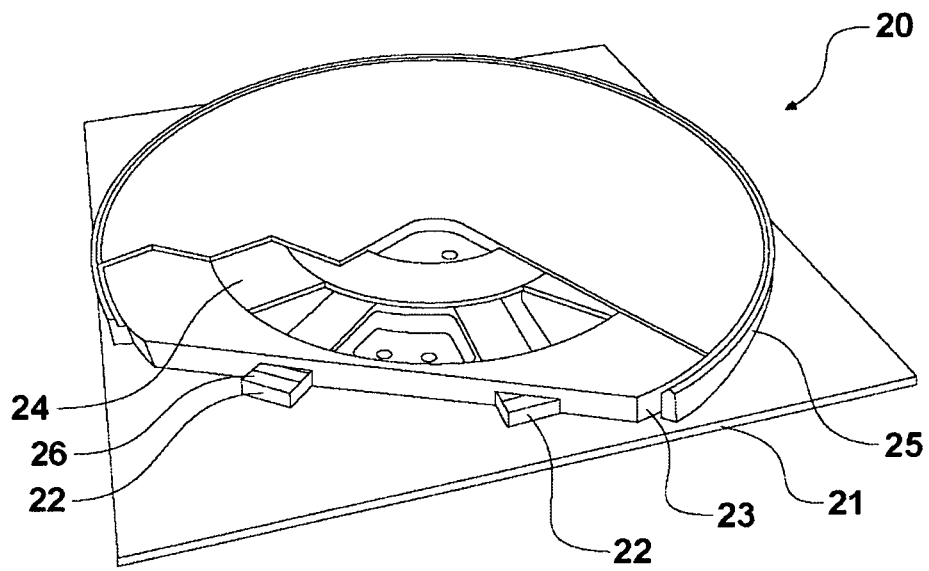
FIGS. 3 to 5 are alternative perspective views of the embodiment of the IPT pad of FIG. 2, with portions removed in FIGS. 3 and 5, and portions shown in ghost outline in FIG. 4 so as to show internal detail.
Figure 4:
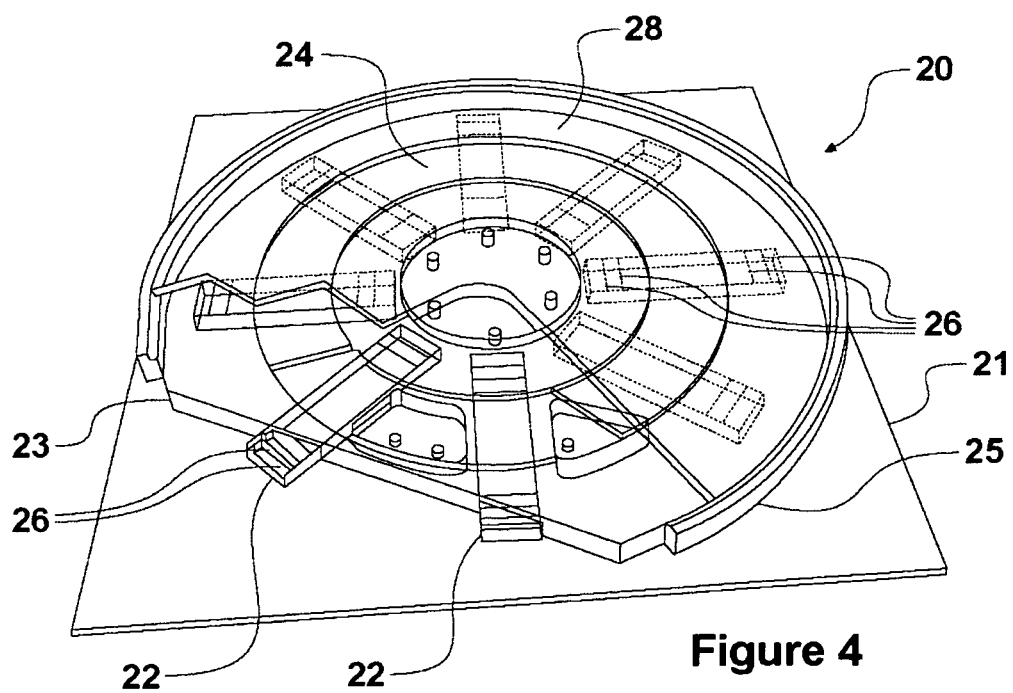
Figure 5:
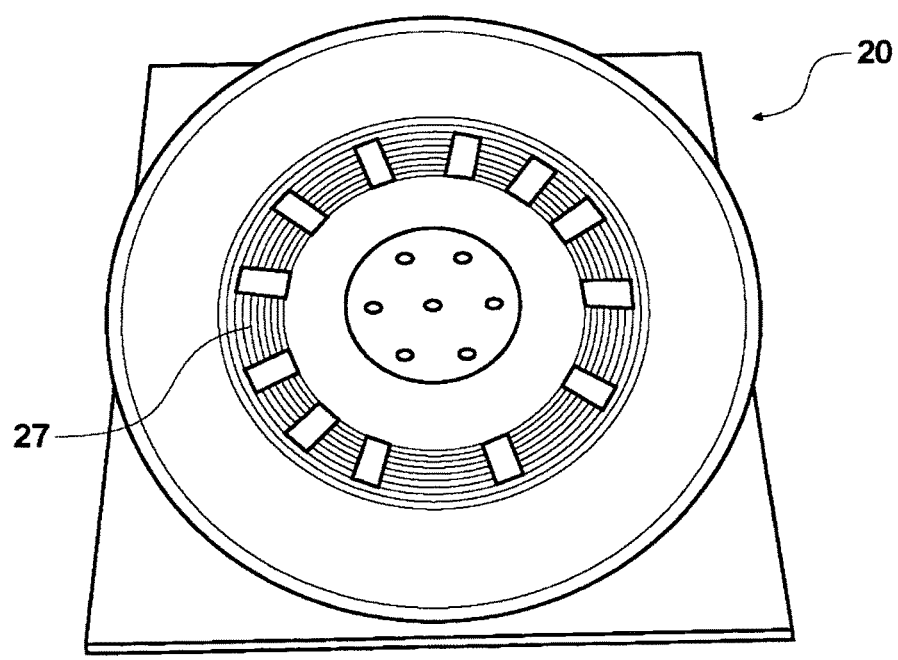

FIGS. 2 to 5 show alternative perspective views of charging pad 20 according to preferred embodiments of the invention. More particularly, FIG. 2 shows the outer housing of the pad, FIG. 3 shows the pad with a portion of the outer housing cut away to show interior detail, FIG. 4 corresponds to the view of FIG. 3 with exterior features shown as see-through to provide additional detail of the internal arrangement of the components, and FIG. 5 shows the pad with the top cover removed. Note that the pickup pad is of the same configuration as charging pad 20 and description of charging pad 20 also applies to the pickup pad, except that charging pad 20 is coupled to an electrical supply (e.g. the mains electricity supply) and the pickup pad is attached to a load (i.e., the vehicle battery to be charged).

Pads 20 are preferably placed an object formed from a material which substantially limits the passage of magnetic flux, such as a metallic backplate 21 (which is formed from aluminium in a preferred embodiment) with 8 ferrite bars 22 displaced at 45 degrees with respect to each other. Bars 22 are held in position by rubbery moulding 23. A coil of litz wire 27 (see FIG. 5) is linked by the magnetic flux passing through ferrite bars 22. Preferably, the coil of litz wire 27 is located on ferrite bars 22 in region 24 of pad 20 so that the coils wind round the generally circular body of the pad approximately half way along the lengths of bars 22. Aluminium strip 25 is coupled or formed integral to backplate 21 to assist in controlling the pattern of the flux generated. Cover 28 is coupled to the top of the main circular body of the pad. Cover 28 is formed from a material, such as PVC, or preferably a non-toxic plastic, which does not obstruct the passage of flux therethrough. The particular configuration shown enables the pads to be relatively slim-line which is particularly important for the pickup pad when retrofitted to existing vehicles so as to maintain ground clearance.

More particularly, backplate 21 and strip 25 are appropriately coupled to work together to direct flux generated by the charging pad through cover 28 in a generally perpendicular direction to backplate 21, thereby providing for improved coupling between a charging pad and a pickup pad since there is less leakage caused by the splay of flux in directions generally parallel to backplate 21. Backplate 21 and strip 25 are electrically connected in one embodiment of the invention.

Mechanical or shock insulating pads 26, preferably formed from foam or rubber, are provided to prevent bars 22 from coming into contact with other components of pad 20. Bars 22 are brittle and thermally sensitive, thus pads 26 are ideally also thermally conductive to keep the bars 22 cool. Mechanical insulating pads 26 also limit the transfer of mechanical stresses to bars 22 caused by knocks or impacts on pad 20 and also due to vibrations such as those generated when pad 20 is mounted on a vehicle.

Using pads configured as shown in the drawings, with a diameter of 400 mm and a thickness of 22 mm, power transfer at rates of up to 2 kW is readily achievable for lateral misalignments of up to +/−50 mm and vertical separations of 25 mm to 75 mm. Power transfer with even larger tolerances is possible but this requires larger pads, increasing the cost. Where a charging pad is provided on a floor to couple with a pickup pad on the underside of a vehicle, these tolerances translate into tolerances for the parking position of the vehicle. Relatively simple methods may be used to assist a driver in parking in the correct position. For example, a ball on a string may be suspended from the ceiling and aligned with a spot on the windscreen when the vehicle is in the correct position. Alternatively, a charging indicator may be provided in the vehicle that lights up when the battery is charging and hence the vehicle is in the correct position. Other alternatives will be readily apparent to one of skill in the art and all such alternatives are within the scope of the present invention.

According to preferred embodiments involving a transfer rate of up to around 2 kW, bars 22 preferably have a height of 10 mm, width of 30 mm and length of 120 mm, and coil 27 preferably comprises litz wire having 0.2 mm diameter individually insulated wires with 120 strands at 3.77 mm$^2$ or more. Strip 25 preferably has a thickness of around 4 mm and cover 28 preferably has a thickness of approximately 5 mm. It should be noted that the invention is not limited to these particular values and the skilled person will be aware that other values may be selected depending on the desired operational characteristics.

According to embodiments of the invention, the power pad on the floor under the vehicle takes the place of a 'track' in a more conventional IPT system and the power pad attached to and under the vehicle is the pickup coil. Using the technique described in the above mentioned New Zealand Patent Application No. 545664, this arrangement of coils allows power to be passed from the floor power pad to the vehicle power pad at high efficiency such that the battery on the vehicle may be charged overnight.

Embodiments of the IPT system make opportunity charging of an electric vehicle possible, not only for a single vehicle in the home, but also, for example, for a fleet of delivery vehicles and the like to allow continuous operation on a 24×7 basis given that the work schedule includes relatively long times where the vehicle can be parked over the floor mounted power pad. However, the typical charging rate of 2 kW does not overcome the limited range problem of electric vehicles, where the total energy demand exceeds the available stored energy.

To address this problem, a high power, plug-in charger may be connected to the vehicle using a separate high power plug to provide rapid charging of the battery. Not all battery types are capable of accepting powers of the magnitude envisaged but lithium batteries are increasingly capable of doing this.

As noted above, the power pad intervention-free charger is a home-based IPT charging system providing a charging power of about 2 kW to stay within the ratings of conventional household wiring. A typical battery in an electric vehicle may store 50 kWH of energy or 170 AH (Ampere-Hours) at 300V so that the nominal charging rate is 0.04C (where C stands for the capacity of the battery in AH). This is a conservative and safe estimate. With a single 12 hour charge, 24 kWH of energy may be transferred and if the vehicle operates with an average power demand of 10 kW, it will have a range of about 2 hours of driving or approximately 160 km per day. With a longer charging time this range can be doubled by having the vehicle fully charged. On the other hand, embodiments of the high power battery charger may provide power at a rate of 10 kW-500 kW for 6 minutes corresponding to a charging rate of 10C. Thus in 6 minutes, the battery is fully charged and the vehicle is set for another 300 km before it needs to be charged again. Note that an electric power flow of 500 kW is high but is still low compared with the energy flow rate when pumping petrol or diesel fuel into a tank.

This rapid charging will need to be carefully supervised, as needed for pumping petrol, and is not suitable for home applications for a number of reasons. Few houses have access to a 500 kW utility network and at this power level the source of supply would be at a higher voltage than the normal distribution network. There is also a degree of hazard involved so that a commercially rated facility is required. In contrast, the IPT system is safe and easy to use, making it suitable for installation in the home or other places a car may be parked, such as in public car parks.

The combination of these technologies provides a vehicle with excellent characteristics. On a daily basis it is ideal for short trips, commuting and shopping, allowing relatively low cost travelling for typically 160 km/day with minimal maintenance and no queuing for fuel. It may be used for longer trips requiring refueling about every 300 km.

Figure 5A:
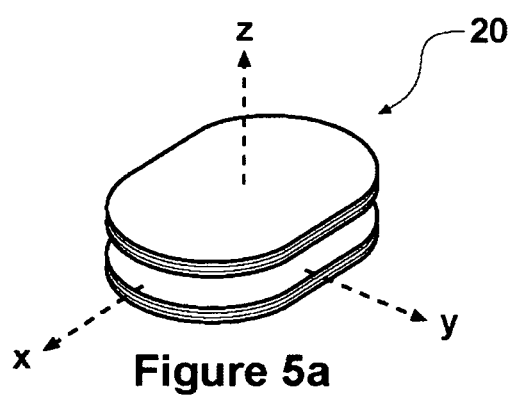
FIG. 5A is a view of an alternative embodiment of an IPT pad configuration.
Figure 5B:
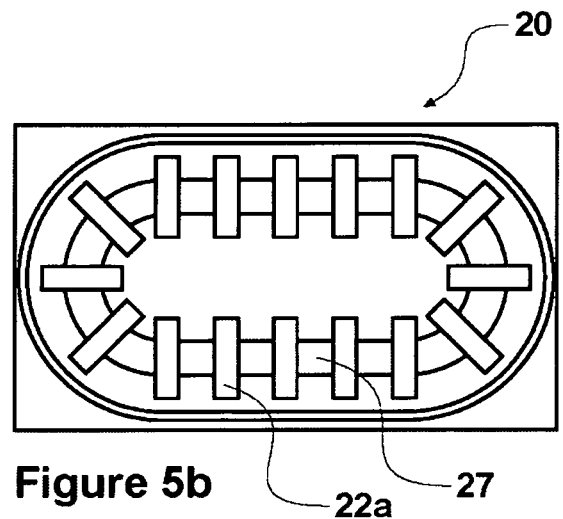
FIG. 5B is a plan view of the alternative embodiment of the IPT pad of FIG. 5A.

FIGS. 5A and 5B show an alternative embodiment of the charging pad configuration 20 according to the present invention. In FIGS. 5A and 5B the pad 20 is an oval shape in plan. Oval power pads can be constructed by extending the circular power pads and adding identical rectangular sections in the middle. The construction of both power pads is again preferably identical. In FIG. 5B it is shown that the coil 27 is lengthened and a subset of additional ferrite or ferromagnetic bars 22A are added with similar spacing to that of the subset of bars equivalent to those of the circular power pad described above.

The advantage of this oval-shaped arrangement is that the tolerance of the pad to lateral movement (in the x direction shown in FIG. 5A) is improved over the circular pad. This is advantageous as it is relatively difficult to adjust the position of a vehicle in the x direction, corresponding to a side to side movement for the vehicle. The tolerance of the pads to pickup movement in the y direction, corresponding to the forward and reverse directions of a vehicle when positioned over the pad, is less that that for the circular pad. However, this is less critical when parking a vehicle since it is comparatively much easier to make adjustments in this direction so as to be optimally positioned over the pad in the y direction.

The ability to control the spacing between the charging pad and the pickup pad attached to the vehicle is also advantageous. This can be achieved using a variety of methods. For example, the charging pad on the floor may include means for raising and lowering it from the floor such as a jack. The jack may be hand or electrically powered. Alternatively, the pickup pad on the underside of the vehicle may include means for increasing or decreasing its distance from the underside of the vehicle. Again, this may be a jack or other known mechanisms.

One of the primary advantages of the system described herein is one of safety. An inductive charger means there is no plug connection between the charger and the vehicle, unlike in alternative electric vehicle charging systems. If a user accidentally drives the vehicle away whilst still connected in a plugged system, the apparatus may be damaged and a hazardous situation may arise through broken current-carrying equipment. In contrast, using an IPT system with no requirement to first safely disengage any plugs, the vehicle would be able to drive safely away, without fear of damage to the equipment or risk of electricity hazard. Furthermore, in the event of flood, the IPT system can function very safely without the obvious dangers of alternative plugged systems.

Figure 6:
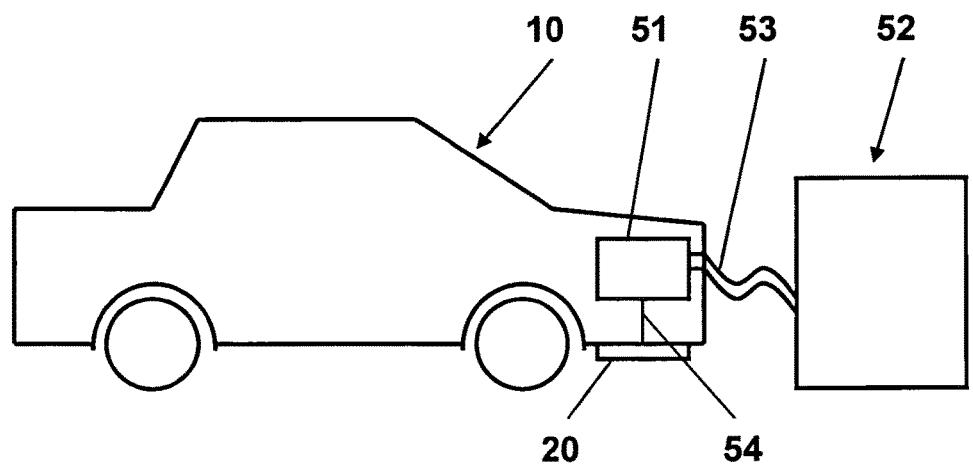
FIG. 6 is a schematic representation of an electric vehicle being charged according to an embodiment of the invention.

FIG. 6 is a schematic drawing of battery 51 of electric vehicle 10 being charged by high power electrical supply 52 via cable 53. During opportunity charging, battery 51 is supplied with electricity from pickup 20 via wiring 54. High power electrical supply 52 may comprise a high power generator or alternatively merely provides an interface or conduit between a high power electricity network and cable 53. Cable 53 is provided with a plug (not shown) which mates with a socket (not shown) provided in vehicle 10. Wiring between the socket and battery 51 transfers electricity to battery 51. Preferably, the plug is provided with a safety housing to prevent access to the electrical contacts. The socket may be provided at any point on vehicle 10 with wiring provided between the socket and battery 51. Thus, the invention is not limited to the position of the socket shown in FIG. 6.

Figure 7:
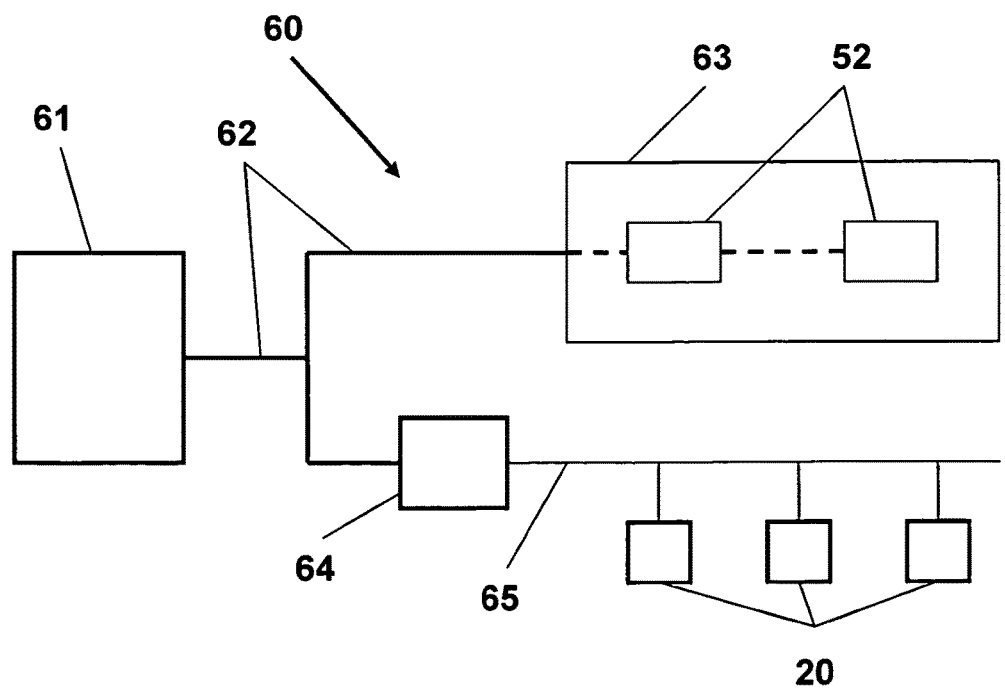
FIG. 7 is a schematic representation of an embodiment of a system according to the invention.

FIG. 7 is a schematic representation of a system, generally marked 60, according to an embodiment of the invention. Generator 61 provides high power electricity to facility 63 which includes high power electrical supplies 52 of FIG. 6. Two high power electrical supplies 52 are shown. However, as would be apparent to one skilled in the art, the invention is not limited thereto and facility 63 may include one or any number of supplies 52, limited only by the available space and the capacity of generator 61. High power cabling 62 acts as a conduit for the transfer of high power electricity to facility 63 and also to transformer 64 which reduces the supply to that of a lower power, such as that conventionally found in homes. Lower power cabling 65 then transfers lower power electricity to charging pads 20, preferably provided in the floor of a user's garage. Whilst single generator 61 is shown, system 60 may include a plurality of generators and may include separate generators for the high power supply and the lower power supply.

An important aspect of electric vehicles is their capital cost. They are typically more expensive than conventional motor cars due to the high cost of the battery. However, according to embodiments of the invention, the battery and the vehicle may be owned by different parties. More particularly, according to one embodiment of a system and method according to the invention, the battery may be owned by a utility company and leased to an owner of a vehicle. According to such embodiments, users of electric vehicles are clearly provided with the benefit of having a reduced capital outlay at the time of purchasing a vehicle. However, benefits may also be realised by utility companies and not only through charges levied for supplying the electricity. In particular, through appropriate control of power supplied to the IPT charging pads, utility companies may level their electric load, particularly overnight when a large number of batteries for electric vehicles may be charging.

With some modification to the electronics system it is also possible to transfer power in reverse from the battery to the utility. In this way at times of peak power in the utility, power may be taken from the vehicle battery and used to supply the peak. With a greater number of vehicles this reverse power may be very large and may avoid power shortages. The total energy may be small as the time that the reverse power flow occurs will likely be short.

There are significant financial advantages to a utility company being able to have a load factor of 1 and this source-side control of a demand-side load would allow this ideal to be approached, if not reached.

A communications channel may be provided between the controller of the network (typically, the utility company) and the vehicles under charge so as to enable monitoring of the charging of these vehicles. A simple cell-phone channel may be used for this purpose. As the available power varies the network controller may vary the battery charging demand to match it. This would allow the utility company to operate near their maximum power with safety as the electric vehicle load can be varied so quickly. This is similar to but more sophisticated than a ripple control system commonly used to control hot water heating. The essential differences are that partial loads are possible, and the loads can be varied more quickly and precisely.

The ability to manipulate the demand makes it more readily possible to integrate highly fluctuable 'renewable' sources of energy into power networks. The manipulation may alternatively be made by allowing the frequency of the network or grid to vary in response to variations in the fluctuable source. Thus, in strong gusts of wind over a whole wind farm the power surge may be such that the mains frequency increases by a small fraction of 1 Hz. These variations in frequency are measured by the power supply to the IPT charging pad and used to control the power pad or track current. In principle, the power transferred is made proportional to the pad current so that by varying the pad current the charging load can be matched to the available power. The variation can take place in as short a period as one cycle of the mains power.

For a large number of battery chargers, say 100,000, the pad current could be programmed so that, for example, at 49.5 Hz the pad current is zero, and at a frequency 1 Hz higher the pad current is the full rated current. If all the chargers were at full demand the charging load would vary from 100,000×2 kW=200 MW at a frequency of 50.5 Hz to zero at a frequency of 49.5 Hz. The 49.5 Hz set-point can of course also be varied so that full power occurs at whatever frequency is required. For example, if the set point was 49 Hz then full power would be taken at 50 Hz or higher. In this manner, high surges in power caused by strong gusts of wind over large wind farms can be compensated for.

On the other hand, in the integration of wind power into a power network, there are also commonly periods where the wind completely 'dies'. In practice, these periods must be covered by having a separate spinning generator of the same power capacity, on standby. Thus, if a 200 MW wind farm is to be used then 200 MW of spinning reserve must be connected to the grid, and under ideal circumstances it provides no real power at all. This protection is very expensive and in many cases makes wind power uneconomic. According to the present invention, this precaution is not required. If the wind 'dies' then all the battery charging load drops as soon as the mains frequency reaches the given set point (e.g. 49.5 or 50 Hz). As the vehicles charge they will individually disengage themselves as soon as their batteries are fully charged so that the actual load is indeterminate and is not simply the total number of vehicles connected. The load could be determined using a communication channel with each vehicle as discussed above but this would take time and a simpler option is available. If the set point was at 49.5 Hz then all of the connected vehicles that are still charging would be at 50% power if the frequency was 50 Hz. If the set point was then changed to 49.6 Hz then the charging vehicles would drop to 40% of their rated power and the change in power, over the whole country, would be 10% of the connected (total) power sink. In this particular example the actual power being taken could be increased by 6 times this change, or reduced by 4 times. In essence, the controllable battery charging load has been precisely determined.

In these circumstances a very high percentage of wind power and/or other fluctuable energy sources can now be included into the generation mix without standby generators knowing how much power is available if the wind dies, and how much spare sink capacity is available if there is a surge. This is a significant advantage over most wind farm integration schemes and will allow the percentage of wind power to be increased above the presently used 6% commonly in, for example, Ireland and Germany, with zero or minimal standby generators necessary. Other schemes for achieving this flexibility use huge batteries locally at the wind farm to store surplus power but it is more efficient if the energy is transferred directly to its destination, namely the batteries in the vehicles, since this requires only one battery charging operation. Batteries at wind farms are therefore significantly less efficient if the ultimate use of the energy is in electric vehicles.

The financial justifications of the invention are interesting. If a typical battery cost $10,000 it might be leased to the car owner for $40/week plus electricity charges of 12 c/kWH charged on the basis of what has been used. A user doing 300 km per week might use 45 kWH at a cost of $5.40 plus the battery lease fee of $40 for a total cost of $45.40 or 15 c/km. Some form of road-user charge would also likely be involved or again added to the cost of the electricity. This cost/km is perhaps high but is for very moderate usage and if the distance travelled is doubled the cost/km is significantly reduced at $50.80 for 600 km or 8.5 c/km.

Electricity generated from renewable sources other than wind power (e.g. solar, tidal etc) is also applicable to embodiments of the invention. All of these are not particularly stable and like wind may vary considerably over relatively short time scales. For example, measured rates of change for wind power in New Zealand have been as high as 200 MW in 5 minutes from a wind farm with a nominal rating of 200 MW. Thus the integration of such highly fluctuable sources into an electricity network is a huge advantage. With the source-side control as outlined the charging load varies at a rate sufficient to match the fluctuable power on almost a cycle by cycle basis using small changes in the frequency of supply, allowing the use of energy that would otherwise simply be wasted. This energy would be generated at a considerably lower cost than electricity from more conventional sources.

The invention thus allows off-peak power to be used effectively and safely for electric vehicle charging. It also allows energy generated from renewable sources to be conveniently put to use to charge electric vehicles. Furthermore, the invention allows load demand to be controlled.

Unless the context clearly requires otherwise, throughout the specification, the words "comprise", "comprising", and the like, are to be construed in an inclusive sense as opposed to an exclusive or exhaustive sense, that is to say, in the sense of "including, but not limited to".

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. An inductive power transfer pad to receive power from a transmitting pad, the inductive power transfer pad comprising:
   one or more permeable magnetic material members in a first layer;
   a coil having at least one turn of a conductor, the coil being arranged in a second layer substantially parallel to that of said permeable magnetic material members; and
   a shield member comprising a backplate defining a third layer, said backplate arranged to control electromagnetic flux generated by said transmitting pad.

2. The inductive power transfer pad as claimed in claim 1, having a plurality of permeable magnetic material members in a form of bars each being arranged such that its length extends radially from a common point but spaced apart therefrom.

3. The inductive power transfer pad as claimed in claim 2 wherein the coil is positioned to wind around the common point such that it passes each bar at approximately a center of the length of each bar.

4. The inductive power transfer pad as claimed in claim 1 wherein a plane of the backplate is substantially parallel to planes of each of the permeable magnetic material members and the coil, the plane of the or each permeable magnetic material member is located between the plane of the backplate and the plane of the coil.

5. The inductive power transfer pad as claimed in claim 1 wherein the backplate is formed from a material which substantially inhibits the passage of magnetic flux therethrough.

6. The inductive power transfer pad as claimed in claim 5 wherein the backplate is formed from one at least one of copper and aluminum.

7. The inductive power transfer pad as claimed in claim 1 wherein the backplate extends beyond coil and slabs.

8. The inductive power transfer pad as claimed in claim 1, wherein the or each permeable magnetic material member comprises ferrite.

9. The inductive power transfer pad as claimed in claim 1, wherein the backplate is arranged to control the electromagnetic flux substantially perpendicular to the third layer.

10. The inductive power transfer pad as claimed in claim 1 wherein the shield member is arranged to control the electromagnetic flux between the inductive power transfer pad and the transmitting pad.

11. The inductive power transfer pad as claimed in claim 1 wherein the backplate is arranged to direct electromagnetic flux generated by the transmitting pad.

12. An inductive power transfer pad as claimed in claim 11 wherein the electromagnetic flux is directed substantially perpendicular to the third layer.

13. An inductive power transfer system comprising a wireless power receiver pad separable from a wireless power transmitter pad, the two said pads each comprising:
  one or more permeable magnetic material members in a first layer;
  a coil having at least one turn of a conductor, the coil being arranged in a second layer substantially parallel to that of said permeable magnetic material members; and
  a shield member comprising a backplate defining a third layer, said backplate arranged to control electromagnetic flux.

* * * * *

(12) INTER PARTES REVIEW CERTIFICATE (3031st)
United States Patent
Boys et al.

(10) Number: US 9,767,955 K1
(45) Certificate Issued: Mar. 8, 2023

(54) MULTI POWER SOURCED ELECTRIC VEHICLE

(71) Applicants: John Talbot Boys; Grant Anthony Covic

(72) Inventors: John Talbot Boys; Grant Anthony Covic

Trial Number:

IPR2021-01116 filed Jun. 17, 2021

Inter Partes Review Certificate for:

Patent No.: 9,767,955
Issued: Sep. 19, 2017
Appl. No.: 14/120,197
Filed: May 5, 2014

The results of IPR2021-01116 are reflected in this inter partes review certificate under 35 U.S.C. 318(b).

INTER PARTES REVIEW CERTIFICATE
U.S. Patent 9,767,955 K1
Trial No. IPR2021-01116
Certificate Issued Mar. 8, 2023

AS A RESULT OF THE INTER PARTES REVIEW PROCEEDING, IT HAS BEEN DETERMINED THAT:

Claims 1-13 are cancelled.

* * * * *